United States Patent Office 2,798,701
Patented July 9, 1957

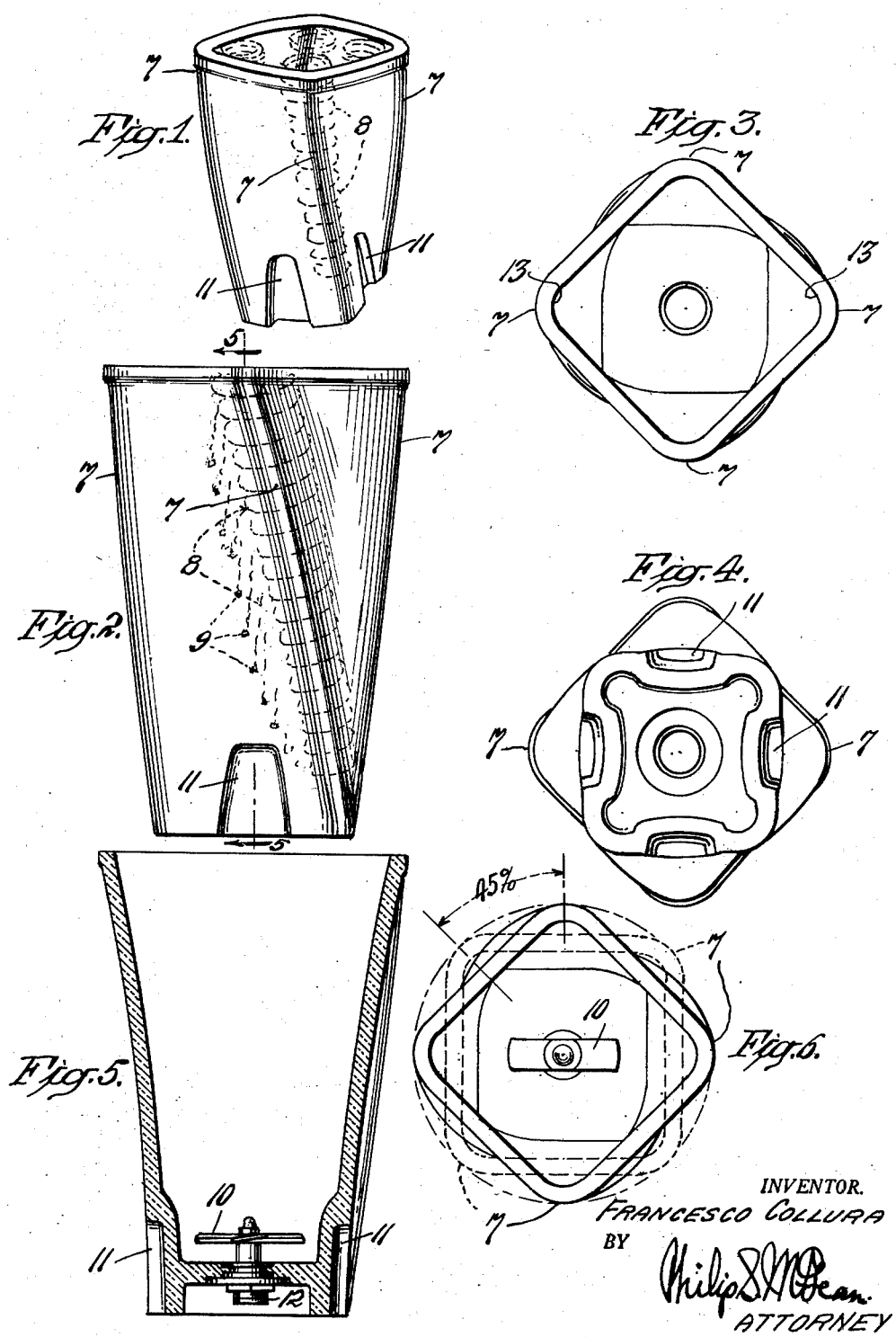

2,798,701
BLENDER JAR

Francesco Collura, New York, N. Y.

Application September 12, 1955, Serial No. 533,724

1 Claim. (Cl. 259—107)

The invention herein disclosed relates to blenders and mixers and is a continuation in part of that disclosed in patent application Serial No. 377,342, filed August 31, 1953, now Patent No. 2,744,203 dated May 1, 1956.

The objects of this invention are to accomplish a more rapid and more thorough mixing and blending than has been possible with previous constructions and to attain these and other desirable results with simple, practical and inexpensive apparatus.

Briefly considered, the invention comprises a novel form of blender jar of substantially square horizontal section and having a helical twist from the bottom to the top of the jar carrying the corners of the jar into helically inclined relation and which in conjunction with the rotating cutter in the bottom of the jar, creates a series of rising inclined and twisting columns in the contents of the jar.

This accomplishes a continuous, progressive ascendancy and selective precipitation of heavier and lighter particles from the inclined columns, resulting in faster and more nearly complete uniform blending of materials.

Other novel features of the invention and resulting advantages will appear more fully as the specification proceeds.

The drawing accompanying and forming part of the specification illustrates a present preferred embodiment of the invention but structure may be modified and changed within the intent and scope of the invention as hereinafter defined and claimed.

Fig. 1 in the drawing is a perspective view of the blender jar;

Fig. 2 is an enlarged side elevation of the same;

Fig. 3 is a top plan view and Fig. 4 is a bottom plan view of the jar;

Fig. 5 is a vertical sectional view of the jar as on substantially the plane of line 5—5 of Fig. 2;

Fig. 6 is a top plan view illustrating the circular square formation of the jar with the blending cutter in the bottom of the same.

As shown particularly in Figs. 1 and 2, the jar is of substantially square horizontal cross-section having substantially square upper and lower ends twisted out of alignment about one-quarter of a turn to provide with downward taper of the jar, as indicated, helico-spiral corners 7 which in the use of the jar will produce upwardly spiralling inclined vortices or whirling columns of material represented by the broken lines at 8.

In these same views broken lines 9 show how particles of successively heavier weight will progressively fall out of these inclined spiralling columns to be recirculated and reduced by the cutter blades 10 operating in the bottom of the jar.

The cutter may be of conventional design journaled in the bottom of the jar as indicated in Fig. 5, and adapted to be coupled directly or indirectly to a motor or other means for operating the same.

A special feature of the invention is that preferably, for most operations, the cutter is rotated in the opposite direction from the helical turn or twist of the jar body so that the jar, to an extent, may resist and oppose rotation imparted to the contents by the cutter blades. This control of the rising currents is a considerable factor in the complete and uniform blending of contents, maintaining materials in the field of action of the blades and causing these materials to strike the inclined corner edges of the jar with greater velocity and greater turbulence effect.

This results in more thorough and a more rapid reduction and blending.

The square cross-section of the jar and constant upward twist brings the inner corners of the jar, because of the incline, downward, closer to the leading edges of the cutter blades, thus to promote mixing and blending action. The gradual upward enlargement or expansion of the jar facilitates this faster blending action.

While generally preferred to have the twist of the jar shape reverse to that of the cutter so as to oppose rotation of contents, it is contemplated that the twist of the jar may be in the same direction as the cutter rotation to expedite upward flow and effect a blending action which may be preferred for certain materials.

The twisted formation of the jar, in addition to mechanical processing advantages described, provides a more desirable, attractive, ornamental appearance and resistance to breakage and provides, as well, a better grip for handling the jar and convenient pouring spouts practically in any position in which the jar may be picked up. The factor of greater strength is of particular importance when the jar is made of glass. Other materials such as plastics and metals, however, may be used.

The driving means for the cutter is indicated at 12, Fig. 1, as a motor driven shaft carrying a coupling element engageable with the cutter shaft.

Also, the means for positioning and holding the jar on the blender base or stand are not illustrated, though the jar is shown as having recesses 11 in the sides of the same for engagement over holding pads on the top of the blender base.

While referred to and considered as of square cross-section, it will be noted that the corners of the jar are more or less rounded, as shown at 13, Fig. 3, and it is contemplated that this angular cross-sectional shape may be further varied within the intent of the invention and scope of the following claim.

The ascending inclined vortices created by the twisted corners of the angular sided jar, as indicated in Fig. 2, may collapse to an extent one on top of the other, creating further turbulence and intermixture of the jar contents.

What is claimed is:

Mixer and blender comprising a stationary rigid permanent form upright liquid holding mixing jar of angular cross section having substantially flat sides connected by rounded corners and said sides and connecting corners being twisted bodily from the bottom angular cross section to the top angular cross section of the jar and thereby establishing helically progressive upwardly inclined channels in the rounded corner portions of the jar and a rotary cutter and propeller in the bottom of the jar for creating upwardly rising columns of material which will be deflected by said twisted inclined corner channels and caused to precipitate heavier solid particles back downward repeatedly within range of the cutter.

References Cited in the file of this patent
UNITED STATES PATENTS

| | | |
|---|---|---|
| 1,592,601 | Hines | July 13, 1926 |
| 1,764,760 | Soule | June 17, 1930 |
| 1,840,857 | Testrup et al. | Jan. 12, 1932 |
| 2,203,697 | Rinkel | June 11, 1940 |
| 2,394,450 | Hogaboom | Feb. 5, 1946 |